United States Patent [19]

Tsuyoshi

[11] Patent Number: 4,996,293

[45] Date of Patent: Feb. 26, 1991

[54] COMPOSITION COMPRISING POLYIMIDE RESIN FROM DIPHENYL SULFONE -3,3',4,4'-TETRACARBOXYLIC ACID DIANHYDRIDE

[75] Inventor: Ikeda Tsuyoshi, Neyagawa, Japan

[73] Assignee: New Japan Chemical Co., Ltd., Kyoto, Japan

[21] Appl. No.: 275,176

[22] PCT Filed: Feb. 12, 1988

[86] PCT No.: PCT/JP88/00145

§ 371 Date: Oct. 12, 1988

§ 102(e) Date: Oct. 12, 1988

[30] Foreign Application Priority Data

Feb. 13, 1987 [JP] Japan .................................. 62-32030
Jul. 17, 1987 [JP] Japan ................................. 62-179752

[51] Int. Cl.[5] ...................... C08G 73/10; C08L 79/08
[52] U.S. Cl. .................................. 528/352; 524/607; 525/431; 525/432; 525/436; 528/125; 528/126; 528/128; 528/185; 528/188
[58] Field of Search ............... 528/353, 125, 126, 128, 528/185, 188, 352; 525/436, 431, 432; 524/607

[56] References Cited

U.S. PATENT DOCUMENTS 4,720,539 1/1988 Rabilloud et al. .................. 528/353

OTHER PUBLICATIONS

Chemical Abstract, 101:7828p, Polyomic and Derivative and Polyimide.

Primary Examiner—Harold D. Anderson
Attorney, Agent, or Firm—Armstrong, Nikaido, Marmelstein, Kubovcik & Murray

[57] ABSTRACT

This invention provides:

A. A polyimide resin composition which comprises at least one polyimide having a repeating unit of the general formula

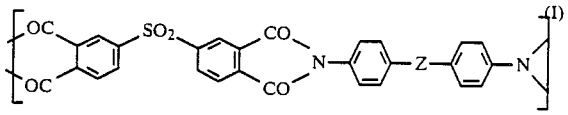

wherein Z is —S—,

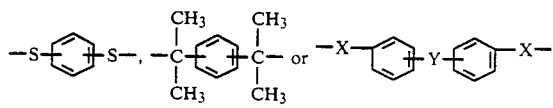

in which X is —O—, —S— or

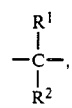

Y is a single chemical bond or a bivalent group selected from the group consisting of —O—, —S—, —SO$_2$—,

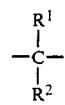

and —CO—, and R[1] and R[2] are the same or different and each independently is a hydrogen atom, a halogen atom or a lower alkyl group which may optionally be substituted by a halogen atom or atoms, and having an inherent viscosity ($\eta_{inh}$) of about 0.3— about 5.0 dl/g, the polyimide being dissolved in an organic solvent, and a method of producing such composition and B. A polyimide resin composition which is otherwise the same as the above composition but further contains a silane coupling agent added thereto, and a method of producing such composition.

15 Claims, 1 Drawing Sheet

COMPOSITION COMPRISING POLYIMIDE RESIN FROM DIPHENYL SULFONE -3,3',4,4'-TETRACARBOXYLIC ACID DIANHYDRIDE

TECHNICAL FIELD

This invention relates to a novel polyimide resin composition and a method of producing the same.

BACKGROUND ART

Aromatic polyimides have high thermal resistance and good mechanical and electrical characteristics. On the other hand, however, they have problems in that since they are generally unmeltable and, moreover, insoluble in organic solvents of common use, hence they can be molded only with difficulty.

A method so far employed generally to solve such problems comprises synthesizing a soluble intermediate, such as a polyamic acid, by reacting an aromatic tetracarboxylic dianhydride with an aromatic diamine, which are starting materials for the manufacture of aromatic polyimides, in a polar organic solvent, giving a particular shape to the intermediate in that intermediate stage and thereafter dehydrating the same for ring closure at high temperatures to give a polyimide. However, this method is disadvantageous in that the intermediate has poor stability, that, therefore, standing at room temperature readily results in viscosity change and/or turbidity, and that since the dehydration reaction is conducted after molding, defects such as voids and pinholes tend to form and make it difficult to obtain surface-smooth and homogeneous moldings.

Accordingly, it is to be desired that a polyimide soluble in an organic solvent, readily moldable into films and so forth and free of the above-mentioned drawbacks should be developed. Thus, a variety of proposals have so far been made. For instance, a method has been proposed which comprises using, as the aromatic tetracarboxylic acid component, a diester form, which is less reactive with the aromatic diamine component than the dianhydride, to give a polyimide which has a low degree of polymerization and is soluble in solvents (Unexamined Japanese Patent Publication SHO 61-83229). However, this polyimide has a drawback that since its molecular weight is low, those heat resistance and mechanical characteristics which are intrinsic to polyimides are decreased in it.

A polyimide is also known which is soluble in solvents as a result of the use, as the aromatic diamine component, of a polynuclear m,m'-diamino compound with the terminal amino groups being in meta positions for the purpose of disturbing the symmetry of the polymer structure and the regularity in repeating units (Examined Japanese Patent Publication SHO 52-30319). However, this polyimide is disadvantageous in that due to the lack of uniformity in the polymer structure it has decreased heat resistance characteristics, namely lower thermal decomposition temperature and lower glass transition temperature. A further disadvantage is that the m,m'-diamino compound to be used is in itself very difficult to synthesize as compared with those p,p'-diamino compounds which are in general use as the aromatic diamine component and, furthermore, is inferior in reactivity to the p,p'-diamino compounds.

Furthermore, a method of producing soluble polyimides by using a p,p'-diamino compound has been proposed which comprises using combinedly two or more aromatic tetracarboxylic acid components differing in skeletal structure (Unexamined Japanese Patent Publication SHO 61-28526, Unexamined Japanese Patent Publication SHO 61-51033). However, it is a drawback of this method that the polymer structure becomes ununiform, hence it is difficult to obtain the same quality constantly. The quality may vary and the polyimide-proper toughness and electric characteristics can hardly be enjoyed to the full.

As mentioned above, all the known methods of solubilizing polyimides in organic solvents have the drawback that the excellent characteristics of aromatic polyimides proper are damaged as a result of giving solvent solubility to the polyimides.

DISCLOSURE OF THE INVENTION

It is an object of the invention to provide a novel polyimide resin composition in the form of a solution in an organic solvent and a method of producing the same.

Another object of the invention is to provide a novel polyimide resin composition which can be molded with ease because of its being a solution in an organic solvent and with which the heat stability, mechanical characteristics, electrical characteristics and other properties intrinsic to aromatic polyimides can be obtained in full, and a method of producing the same.

A further object of the invention is to provide a novel polyimide resin composition in the form of a solution in an organic solvent, which is excellent in adhesiveness to substrates, to say nothing of the excellent heat stability, mechanical characteristics, electrical characteristics and other properties, and a method of producing the same.

These and other objects of the invention will become apparent from the description which follows.

The invention thus provides a polyimide resin composition and a method of producing the same, as specified below.

A. A polyimide resin composition which comprises at least one polyimide having a repeating unit of the general formula

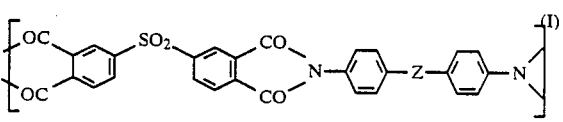

wherein z is —S—,

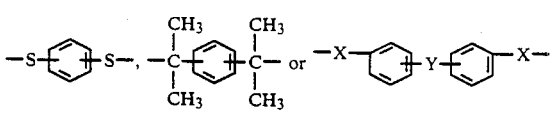

in which X is —O—, —S— or

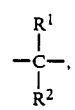

Y is a single chemical bond or a bivalent group selected from the group consisting of —O—, —S—, -SO$_2$—,

and —CO—, and R¹ and R² are the same or different and each independently is a hydrogen atom, a halogen atom or a lower alkyl group which may optionally be substituted by a halogen atom or atoms, and having an inherent viscosity ($\eta_{inh}$) of about 0.3 – about 5.0 dl/g, said polyimide being dissolved in an organic solvent.

B. A polyimide resin composition as defined above which comprises a silane coupling agent added thereto.

C. A method of producing a polyimide resin composition which comprises reacting diphenyl sulfone-3,3',4,4'-tetracarboxylic dianhydride with an aromatic diamine of the general formula

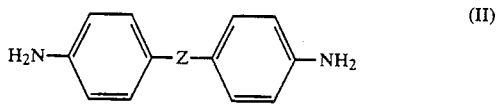

wherein Z is as defined above, in the presence of an organic solvent, for the formation of a polyimide, or separating the polyimide thus formed and then dissolving the same again in an organic solvent.

D. A method of producing a polyimide resin composition as defined above which comprises further adding a silane coupling agent after completion of the polyimide formation reaction.

As a result of their intensive investigations made in an attempt to overcome the above-mentioned drawbacks of the prior art methods, the present inventors obtained the following new findings:

(1) That polyimides obtained by using diphenyl sulfone-3,3',4,4'-tetracarboxylic dianhydride alone as the aromatic tetracarboxylic acid component and, as the aromatic diamine component, the specific p,p'-diamino compound defined above are soluble in organic solvents and have a high inherent viscosity (i.e. a high molecular weight) and a highly uniform polymer structure, hence are excellent in heat stability, mechanical characteristics, electrical characteristics and so forth.

(2) That, therefore, when used in the form of a solution in an organic solvent, the above polyimides can be easily molded into moldings capable of exhibiting the excellent characteristics proper to polyimides.

(3) That when other aromatic tetracarboxylic acid components than the above-mentioned one, for example benzophenone-3,3',4,4'-tetracarboxylic dianhydride and pyromellitic dianhydride, are used, the product polyimides are not soluble in organic solvents.

(4) That further addition of a silane coupling agent to the above-mentioned polyimide solution in an organic solvent can result in excellent adhesiveness to substrates without causing decreases in the heat resistance and other properties of the polyimides.

(5) The above-defined tetracarboxylic dianhydride and p,p'-diamino compound, which are used as the starting materials, can be synthesized with ease and are advantageous from the cost viewpoint.

The present invention summarized above has been completed based on such novel findings.

The above-mentioned polyimide resin composition A can be produced by the above-mentioned method C.

More specifically, said composition can be produced in the following manner.

Diphenyl sulfone-3,3',4,4'-tetracarboxylic dianhydride (hereinafter abbreviated as "DSTA") is used alone as the aromatic tetracarboxylic acid component. However, said component may contain a small amount of the free carboxylic acid form. Provided that the desired effects of the invention can be produced, other aromatic tetracarboxylic acid components may be used combinedly.

The p,p'-diamino compound of general formula (II) is used as the aromatic diamine component. Preferred examples are 4,4'-diaminodiphenyl sulfide, 2,2-bis[4-(p-aminophenoxy)phenyl]propane, 2,2-bis[3-(p-aminophenoxy)phenyl]propane, 2,2-bis[4-(p-aminophenylthioether)phenyl]propane, 2,2-bis[3-(p-aminophenylthioether)phenyl]propane, 4,4'-bis(p-aminophenoxy)diphenyl sulfone, 3,3'-bis(p-aminophenoxy)diphenyl sulfone, 3,4'-bis(p-aminophenoxy)diphenyl sulfone, 4,4'-bis(p-aminophenylthioether)diphenyl sulfone, 3,3'-bis(p-aminophenylthioether)diphenyl sulfone, 3,4'-bis(p-aminophenylthioether)diphenyl sulfone, 4,4'-bis(p-aminophenoxy)diphenyl ether, 3,3'-bis(p-aminophenoxy)diphenyl ether, 3,4'-bis(p-aminophenoxy)diphenyl ether, 4,4'-bis(p-aminophenoxy)diphenyl sulfide, 3,3'-bis(p-aminophenoxy)diphenyl sulfide, 3,4'-bis(p-aminophenoxy)diphenyl sulfide, 4,4'-bis(p-aminophenylthioether)diphenyl sulfide, 3,3'-bis(p-aminophenylthioehter)diphenyl sulfide, 3,4'-bis(p-aminophenylthioether)diphenyl sulfide, 4,4'-bis(p-aminophenylthioether)diphenyl ether, 3,3'-bis(p-aminophenylthioether)diphenyl ether, 3,4'-bis(p-aminophenylthioether)diphenyl ether, 4,4'-bis(p-aminophenoxy)benzophenone, 3,3'-bis(p-aminophenoxy)benzophenone, 3,4'-bis(p-aminophenoxy)benzophenone, 4,4'-bis(p-aminophenylthioether)benzophenone, 3,3'-bis(p-aminophenylthioether)benzophenone, 3,4'-bis(p-aminophenylthioether)benzophenone, 4,4'-bis(p-aminophenoxy)diphenyl, 3,3'-bis(p-aminophenoxy)diphenyl, 4,4'-bis(p-aminophenylthioether)diphenyl, 3,3'-bis(p-aminophenylthioether)diphenyl, 1,4-bis(p-aminophenylthioether)benzene, 1,3-bis(p-aminophenylthioether)benzene, 4,4'-(p-phenylenediisopropylidene)dianiline, 4,4'-(m-phenylenediisopropylidene)dianiline, 2,2-bis[4-(4-aminophenoxy)phenyl]hexafluoropropane, etc.

From the uniform polymer structure viewpoint, it is most preferable that the above-mentioned p,p'-diamino compound be used singly as the aromatic diamine component. If necessary, however, two or more p,p'-diamino compounds may be used in admixture. Provided that the desired effects of the invention can be produced, other aromatic diamine components may be used combinedly.

The polyimide formation reaction is generally carried out in the manner of two-step reaction, namely the synthesis of the intermediate polyamic acid and the dehydration thereof for ring closure, namely polyimide formation.

Thus, the polyamic acid is synthesized by reacting DSTA with the aromatic diamine of general formula (II) in an organic solvent.

For the production of high molecular weight polyimides, the mole ratio between DSTA and the aromatic diamine should preferably be about 0.7 – about 1.3, most preferably within the range of 0.95–1.05.

In the step of polyamic acid production, the reaction temperature is generally about 0 – about 120° C., preferably 5°–80° C., and the reaction time is generally about 0.5 – about 50 hours although said time may vary depending on the diamine and solvent used and on other conditions.

Preferred as the organic solvent to be used in this reaction is an aprotic polar solvent or a phenolic solvent, which can dissolve the polyimide to be formed later. As such organic solvent, there may be mentioned, for example, aprotic polar solvents such as N-methyl-2-pyrrolidone, N,N-dimethylformamide, N,N-diethylformamide, N,N-dimethylacetamide, N,N-diethylacetamide, dimethyl sulfoxide, tetramethylurea, 1,3-dimethyl-2-imidazolidione and hexamethylphosphoramide, and phenolic solvents such as phenol, cresol, dimethylphenol, chlorophenol and bromophenol.

The use of an aprotic polar solvent or a phenolic solvent as the reaction solvent is particularly suited, since, in that case, the polyamic acid synthesis reaction mixture, even when partial polyimide formation has occurred, will not become a gel but can be submitted as it is to the subsequent imidation reaction and the imidation reaction mixture as it is can be made up into the polyimide resin composition according to the invention.

Not only the above-mentioned organic solvents but also such common organic solvents as ketones, esters, lactones, ethers, cellosolves, halogenated hydrocarbons and hydrocarbons can be used in the polyamic acid synthesis reaction although the latter are inferior in dissolving capacity. More specifically, acetone, methyl ethyl ketone, methyl isobutyl ketone, cyclohexanone, acetophenone, methyl acetate, ethyl acetate, butyl acetate, diethyl oxalate, diethyl malonate, γ-butyrolactone, diethyl ether, ethylene glycol dimethyl ether, diethylene glycol dimethyl ether, tetrahydrofuran, diglyme, methyl cellosolve, ethylene glycol monomethyl ether, dichloromethane, 1,2-dichloroethane, 1,4-dichlorobutane, trichloroethane, chlorobenzene, dichlorobenzene, hexane, heptane, octane, benzene, toluene and xylene, for instance, can also be used. In this case, however, it is desirable that the polyamic acid be recovered by a conventional method and, after purification if necessary, it be dissolved in an aprotic polar solvent or a phenolic solvent and submitted to the imidation reaction.

The polyamic acid solution in organic solvent as obtained in the above-mentioned polyamic acid synthesis reaction can be submitted to the imidation reaction either as it is or after recovery from the organic solvent solution by a conventional method, purification thereof if necessary, and dissolution thereof in the above-mentioned aprotic polar solvent or phenolic solvent.

In the above polyamic acid synthesis reaction and the subsequent imidation reaction, either a single organic solvent or a mixture of two or more organic solvents may be used.

Generally, the imidation reaction can be conducted successfully using a polyamic acid solution in an aprotic polar solvent or a phenolic solvent. The reaction is carried out generally at a temperature of about 60 – about 250° C., preferably 100°–200° C. At temperatures below 60° C., no economical rate of reaction can be achieved, whereas, at temperatures above 250° C., coloration of the reaction system and/or secondary reactions will take place disadvantageously.

For the purpose of promoting the reaction by efficiently removing the byproduct water formed during the imidation reaction step, a solvent capable of forming an azeotrope with water and/or a dehydrating agent may be added. Examples of such solvent are benzene, toluene, xylene, ethylbenzene, hexane, heptane, octane, nonane, decane and cyclohexane, and examples of the dehydrating agent are phosphorus pentoxide, acetic anhydride and pyridine-acetic anhydride.

The reaction time for the imidation reaction is generally about 0.5 – about 50 hours although it may vary depending on the kind of polyamic acid, the kind of solvent and other conditions. The polyamic acid concentration in the reaction mixture solution is generally about 1 – about 50% by weight, preferably 3–40% by weight. Concentrations below 1% by weight are economically disadvantageous, while at concentrations above 50% by weight, the reaction mixture solution may disadvantageously become a gel or acquire an excessively high viscosity at which the reaction will proceed ununiformly.

Thus is formed a polyimide. The polyimide according to the invention is highly soluble in organic solvents due to the selective combined use of the above-defined specific aromatic tetracarboxylic acid component and aromatic diamine component. Furthermore, the polyimide can have a satisfactorily high inherent viscosity (i.e. a sufficiently high molecular weight) while retaining its high solubility in organic solvents. The inherent viscosity ($\eta_{inh}$) of the polyimide as referred to herein is the inherent viscosity measured in the N-methyl-2-pyrrolidone solvent at a concentration of 0.5 g/100 ml and at a temperature of 30±1° C. and its value is generally about 0.3 – about 5.0 dl/g, preferably 0.4–2.0 dl/g. Satisfactory moldability and excellent characteristics peculiar to aromatic polyimides can be attained since the polyimide has such a high inherent viscosity and a highly uniform polymer structure. In particular, it has a high thermal decomposition temperature and is particularly excellent in heat resistance.

The polyimide resin composition according to the invention is a solution of the above-mentioned polyimide in an organic solvent. From the viewpoints of solubility and stability of solution viscosity, among others, it is particularly preferable to use at least one of the aprotic polar solvents and phenolic solvents mentioned above with reference to the polyimide formation reaction.

Thus, when the imidation reaction is carried out with a solution in an aprotic polar solvent or a phenolic solvent, the reaction product as it is can be directly used as a composition according to the invention. In that case or when another solvent is used in combination, the polyimide may also be once isolated from the imidation reaction mixture and then dissolved preferably in an aprotic polar solvent or a phenolic solvent to give a composition according to the invention.

It is generally advisable to adjust the polyimide concentration in the polyimide resin composition according to the invention to about 1 – about 50% by weight, preferably 3–40% by weight. Concentrations below 1% by weight are disadvantageous from the economic viewpoint while, at concentrations above 50% by weight, the composition may unfavorably become a gel or acquire an excessively high viscosity, which leads to decreased processability in the step of molding.

Further addition of a silane coupling agent to the above-mentioned polyimide resin composition according to the invention gives the above-mentioned polyimide resin composition C according to the invention.

The addition of the silane coupling agent gives the above composition excellent adhesiveness to substrates without decreasing the heat resistance, mechanical characteristics, electrical characteristics and other properties of the polyimide. The reason why the characteristics of the polyimide are never impaired is presumably that the silane coupling agent is added after completion of the imidation and therefore is neither taken up by the polyimide molecule chain nor affected by the byproduct water.

As the silane coupling agent to be added, there may be mentioned, for example, γ-glycidoxypropyltrimethoxysilane, γ-(2-aminoethyl)aminopropyltrimethoxysilane, γ-(2-aminoethyl)aminopropylmethyldimethoxysilane, γ-methacryloxypropyltrimethoxysilane, γ-mercaptopropyltrimethoxysilane, methylmethoxysilane, methyltriethoxysilane, vinyltriacetoxysilane, N-β-(N'-vinylbenzylaminoethyl)-γ-aminopropyltrimethoxysilane, γ-chloropropyltrimethoxysilane, hexamethyldisilazane, γ-anilinopropyltrimethoxysilane, vinyltrimethoxysilane, γ-chloropropylmethyldimethoxysilane, γ-mercaptopropylmethyldimethoxysilane, methyltrichlorosilane, dimethyldichlorosilane, trimethylchlorosilane, γ-aminopropylethoxysilane, vinyltriethoxysilane, vinyltrichlorosilane, vinyltri(β-methoxyethoxy)silane, β-(3,4-epoxycyclohexyl)ethyltrimethoxysilane, and N-phenyl-3-aminopropyltrimethoxysilane. It is appropriate to add the silane coupling agent generally in an amount of about 0.1 − about 20% by weight, preferably 1–10% by weight, on the polyimide basis.

The polyimide solution composition according to the invention and the composition further supplemented with a silane coupling agent are solutions which are flowable and have a relatively low viscosity at ordinary temperatures. Therefore, they can be handled and molded very easily. Furthermore, they are highly stable in the solution state and can be stored at ordinary temperatures for a long period without undergoing viscosity changes, or denaturation, for example precipitation of an insoluble matter.

These compositions according to the invention can be suitably used in the manufacture or preparation of, for example, heat-resistant varnishes, heat-resistant laminated sheets, heat-resistant films, heat-resistant adhesives as well as electric and electronic materials and applicances and devices in which such materials are used. More specifically, they are used in the manufacture or preparation of printed circuit substrates, flexible circuit substrates, tape carriers, surface-protecting or interlayer insulating films for semiconductor integrated circuit devices, coating materials for enamel wires, various laminate gaskets, and so forth.

In particular, these compositions according to the invention are suited for film manufacture. Films made from the compositions on the smooth surface of a substrate, such as a glass sheet, a metal sheet or the like, by casting or spin coating can be deprived of the organic solvent at relatively low temperatures by heating, for instance, whereby transparent polyimide films can be obtained with ease. These films have high mechanical strength and are rich in flexibility. For example, a 30-μm-thick film made from any of said compositions can endure a repeated bending test to a satisfactory extent. Such films show a thermal decomposition temperature not lower than 500° C., hence have good heat resistance. They also have good chemical resistance. Furthermore, they show thermoplasticity at temperatures above the melting temperature and can be adhered to substrates or the like under pressure and heating or can be compression-molded.

The composition according to the invention which contains a silane coupling agent is suited for application to the substrates made of various materials, for example glass, metals such as silicon, aluminum, copper, nickel and iron, oxides of such metals, and plastics such as polyethylene, polypropylene and polyethylene terephthalate. Since, in particular, said composition is very excellent in adhesiveness to substrates and therefore can give polyimide coat films at low temperatures and in a short period of time by merely evaporating the solvent, the composition can be used very advantageously in cases where the substrates cannot be heated to high temperatures, for example in such fields of use as semiconductor surface protecting films, insulating and protecting films for electronic device circuits, oriented films for liquid crystal display devices on plastic substrates, and so forth.

BEST MODES FOR CARRYING OUT THE INVENTION

The following examples and comparative examples illustrate the present invention in further detail.

In the examples and comparative examples, the solution viscosity, inherent viscosity, thermal decomposition temperature, softening point, tensile strength and modulus of elasticity of each polyimide were measured by the following methods:

(1) Polyimide solution viscosity (ps)

The measurement was performed at a polyimide concentration of 20% by weight and at a temperature of 25° C. using an E type viscometer.

(2) Inherent viscosity ($\eta_{inh}$) of polyimide (dl/g)

The polyimide (0.5 g) was dissolved in 100 ml of N-methyl-2-pyrrolidone. The dropping time for this test solution (t; in seconds) and the dropping time for the solvent ($t_o$; in seconds) were measured at a temperature of 30±0.1° C. using as Ostwald viscometer. The inherent viscosity was calculated as follows:

$$\eta_{inh} = ln(t/t_o)/0.5$$

(3) Thermal decomposition temperature (°C.) of polyimide

A Shimadzu model DT-30 differential thermal analyzer was used. The temperature was raised at a rate of 10° C./minute in the ambient atmosphere, and the temperature at which the weight loss had just reached 10% by weight as compared with the initial weight was determined.

(4) Softening point (°C.) of polyimide

A Schimadzu model DT-30 differential thermal analyzer was used. The temperature was raised at a rate of 10° C./minute in the ambient atmosphere, and the softening point was determined in the penetration mode.

(5) Tensile strength (kg/mm²) and modulus of elasticity (kg/mm²)

An Instron model 1122 tensile tester (Instron Japan Company Ltd.) was used. Both upper and lower ends of a film specimen, 1 in width and 8 cm in length, were clamped each over a length of 1 cm, and the measurement was performed under the following conditions: weight 5 kg, rate of pulling 10 mm/minute.

EXAMPLE 1

A reaction vessel provided with a stirrer, a cooler, a thermometer and a nitrogen gas inlet tube was charged with 43.2 g (0.1 mole) of 4,4'-bis(p-aminophenoxy)-diphenyl sulfone and 300 g of N-methyl-2-pyrrolidone (hereinafter abbreviated as "NMP") and, after nitrogen substitution, the contents were stirred at room temperature until complete dissolution. Then, 35.8 g (0.1 mole) of DSTA was added gradually, and the reaction was conducted at 25°-30° C. for 1 hour to give a transparent, viscous polyamic acid solution. This solution was heated to 160° C. and the reaction was performed for 5 hours to give the desired, transparent, viscous polyimide solution in NMP. This solution had a viscosity of 35 poises (Table 1).

The thus-obtained polyimide solution was poured into methanol, and the precipitated polymer was recovered, dried under reduced pressure, and measured for its infrared absorption spectrum. The absorption due to the amic acid was no more observed at 1670 cm$^{-1}$. Instead, characteristic absorptions due to the imide group were observed at 1720 cm$^{-1}$ and 1770 cm$^{-1}$, indicating that the product was a polyimide. This infrared absorption spectrum is shown in FIG. 1. The values for correction as shown in FIG. 1 are values obtained with a polystyrene film.

The inherent viscosity, thermal decomposition temperature, softening point and other physical properties of said polyimide are shown in Table 2.

This polyimide were readily soluble also in N,N-dimethylformamide (hereinafter abbreviated as "DMF"), N,N-dimethylacetamide, dimethyl, sulfoxide, tetramethylurea, 1,3-dimethyl-2-imidazolidinone, m-cresol, xylenol, o-chlorophenol and p-bromophenol and, in each case, gave a polyimide resin solution having a concentration of about 10% by weight.

EXAMPLE 2

2,2-Bis[4-(p-aminophenoxy)phenyl]propane (41.0 g or 0.1 mole) was dissolved in 300 g of DMF. To the solution was added 35.8 g (0.1 mole) of DSTA gradually, and the reaction was carried out in the same manner as in Example 1 to give a polyamic acid solution. Then, the reaction was conducted at 150° C. for 5 hours to give the desired, transparent, viscous polyimide solution in DMF. This solution had a viscosity of 40 poises (Table 1).

The solution was treated in the same manner as in Example 1, and the polymer obtained was measured for its infrared absorption spectrum. The absorption due to the amic acid was no more observed at around 1670 cm$^{-1}$ and, instead, characteristic absorptions due to the imide group were observed at about 1720 cm$^{-1}$ and about 1770 cm$^{-1}$, indicating that the polymer was a polyimide.

The inherent viscosity, thermal decomposition temperature, softening point and other physical properties of said polyimide are shown in Table 2. This polyimide was soluble also in NMP, dimethylacetamide, dimethylsulfoxide, hexamethylphosphoramide, phenol, o-cresol, 2,6-xylenol and p-chlorophenol and, in each case, gave a polyimide resin solution having a concentration of about 10% by weight.

EXAMPLE 3

In 250 g of m-cresol was dissolved 21.6 g (0.1 mole) of 4,4'-diaminodiphenyl sulfide. To the solution was added 35.8 g (0.1 mole) of DSTA gradually, and then the reaction was conducted in the same manner as in Example 1 to give a polyamic acid solution. Then, the reaction was carried out at 170° C. for 3 hours to give the desired, transparent, viscous polyimide solution. This solution had a viscosity of 34 poises (Table 1).

The solution was treated in the same manner as in Example 1 and the polymer obtained was measured for its infrared absorption spectrum. The absorption due to the amic acid was no more observed at around 1670 cm$^{-1}$ and, instead, characteristic absorptions due to the imide group were observed at about 1720 cm$^{-1}$ and about 1770 cm$^{-1}$, indicating that the polymer was a polyimide.

The inherent viscosity, thermal decomposition temperature, softening point and other physical properties of said polyimide are shown in Table 2. This polyimide was readily soluble also in NMP, N,N-dimethylformamide, N,N-dimethylacetamide, dimethyl sulfoxide, tetramethylurea, phenol and xylenol and, in each case, gave a polyimide resin solution having a concentration of about 10% by weight.

EXAMPLES 4–11

Various diamines as shown in Table 1 were reacted with DSTA in the same manner as in Example 1 to give the corresponding polyimides. The polyimide obtained in each example was treated in the same manner as in Example 1 and measured for its infrared absorption spectrum. For each polyimide, the absorption due to the amic acid was no more observed at around 1670 cm$^{-1}$ and, instead, characteristic absorptions due to the imide group were observed at about 1720 cm$^{-1}$ and about 1770 cm$^{-1}$, indicating the polyimide character of the polymer.

The solvents used and the viscosities of polyimide solutions after the imidation reaction are shown in Table 1 and some characteristics of the polyimides obtained are shown in Table 2.

TABLE 1

| Example | Diamine | Solvent | Solution viscosity |
|---|---|---|---|
| 1 | 4,4'-Bis(p-aminophenoxy)diphenyl sulfone | NMP | 35 |
| 2 | 2,2-Bis[4-(p-aminophenoxy)phenyl]propane | DMF | 40 |
| 3 | 4,4'-Diaminodiphenyl sulfide | m-Cresol | 34 |
| 4 | 1,4-Bis(p-aminophenylthioether)benzene | m-Cresol | 32 |
| 5 | 4,4'-Bis(p-aminophenylthioether)diphenyl ether | NMP | 37 |
| 6 | 4,4'-Bis(p-aminophenoxy)diphenyl sulfide | NMP | 36 |
| 7 | 4,4'-Bis(p-aminophenoxy)benzophenone | NMP | 38 |
| 8 | 4,4'-Bis(p-aminophenylthioether)diphenyl sulfone | m-Cresol | 32 |
| 9 | 4,4'-Bis(p-aminophenoxy)diphenyl ether | DMF | 41 |
| 10 | 4,4'-(m-Phenylenediisopropylidene)dianiline | NMP | 38 |
| 11 | 4,4'-(p-Phenylenediisopropylidene)dianiline | DMF | 40 |

TABLE 2

| Example | Inherent viscosity (ps) | Thermal decomposition temperature (°C.) | Softening point (°C.) | Tensile strength (kg/mm²) | Modulus of elasticity (kg/mm²) |
|---|---|---|---|---|---|
| 1 | 0.79 | 565 | 285 | 12.2 | 271 |
| 2 | 0.83 | 535 | 250 | 11.5 | 258 |
| 3 | 0.65 | 500 | 300 | 8.2 | 290 |
| 4 | 0.91 | 531 | 288 | 10.6 | 277 |
| 5 | 0.75 | 525 | 290 | 9.1 | 281 |
| 6 | 0.87 | 530 | 265 | 8.7 | 260 |
| 7 | 0.81 | 565 | 260 | 9.5 | 257 |
| 8 | 0.69 | 560 | 255 | 8.8 | 263 |
| 9 | 0.81 | 542 | 262 | 10.2 | 280 |
| 10 | 0.81 | 541 | 263 | 11.5 | 258 |
| 11 | 0.79 | 537 | 288 | 12.3 | 272 |

EXAMPLES 12–36

Various diamines specified in Table 3 were reacted with DSTA in the same manner as in Example 1, whereby the corresponding polyimides were synthesized.

The polyimide obtained in each example was treated in the same manner as in Example 1 and measured for its infrared absorption spectrum. In each case, the absorption due to the amic acid was no more observed at around 1670 cm$^{-1}$ and, instead, characteristic absorptions due to the imide group were observed at about 1720 cm$^{-1}$ and about 1770 cm$^{-1}$, indicating the polyimide character of the polymer.

For each polyimide obtained, the inherent viscosity ($\eta_{inh}$) thereof, the reaction solvent used, the polyimide solution viscosity after reaction, and the thermal decomposition temperature are shown in Table 3.

TABLE 3

| Example | Diamine | Inherent viscosity (dl/g) | Solvent | Solution viscosity (ps) | Thermal decomposition temperature (°C.) |
|---|---|---|---|---|---|
| 12 | 4,4'-Bis(p-aminophenylthioether)diphenyl sulfide | 0.87 | m-Cresol | 33 | 562 |
| 13 | 4,4'-Bis(p-aminophenylthioether)benzophenone | 0.67 | m-Cresol | 32 | 531 |
| 14 | 4,4'-Bis(p-aminophenoxy)diphenyl | 0.75 | NMP | 30 | 615 |
| 15 | 4,4'-Bis(p-aminophenylthioether)diphenyl | 0.89 | DMF | 39 | 609 |
| 16 | 3,3'-Bis(p-aminophenoxy)diphenyl sulfone | 0.63 | NMP | 29 | 518 |
| 17 | 3,3'-Bis(p-aminophenoxy)diphenyl sulfide | 0.71 | NMP | 31 | 510 |
| 18 | 3,3'-Bis(p-aminophenoxy)diphenyl ether | 0.62 | DMF | 32 | 513 |
| 19 | 3,3'-Bis(p-aminophenoxy)benzophenone | 0.58 | m-Cresol | 28 | 525 |
| 20 | 3,3'-Bis(p-aminophenylthioether)diphenyl sulfone | 0.61 | m-Cresol | 29 | 511 |
| 21 | 3,3'-Bis(p-aminophenylthioether)diphenyl sulfide | 0.75 | m-Cresol | 30 | 520 |
| 22 | 3,3'-Bis(p-aminophenylthioether)diphenyl ether | 0.73 | m-Cresol | 28 | 522 |
| 23 | 3,3'-Bis(p-aminophenylthioether)benzophenone | 0.55 | m-Cresol | 32 | 530 |
| 24 | 3,3'-Bis(p-aminophenoxy)diphenyl | 0.61 | DMF | 33 | 585 |
| 25 | 3,3'-Bis(p-aminophenylthioether)diphenyl | 0.62 | DMF | 32 | 585 |
| 26 | 3,4'-Bis(p-aminophenoxy)diphenyl sulfone | 0.83 | NMP | 29 | 513 |
| 27 | 3,4'-Bis(p-aminophenylthioether)diphenyl sulfone | 0.71 | NMP | 30 | 509 |
| 28 | 3,4'-Bis(p-aminophenoxy)diphenyl sulfide | 0.75 | NMP | 31 | 515 |
| 29 | 3,4'-Bis(p-aminophenylthioether)diphenyl sulfide | 0.82 | NMP | 33 | 512 |
| 30 | 3,4'-Bis(p-aminophenylthioether)benzophenone | 0.61 | NMP | 28 | 519 |
| 31 | 3,4'-Bis(p-aminophenoxy)benzophenone | 0.82 | m-Cresol | 31 | 518 |
| 32 | 1,3-Bis(p-aminophenylthioether)benzene | 0.72 | NMP | 31 | 533 |
| 33 | 2,2-Bis[3-(p-aminophenoxy)phenyl]propane | 0.81 | m-Cresol | 28 | 515 |
| 34 | 2,2-Bis[4-(p-aminophenylthioether)phenyl]propane | 0.85 | m-Cresol | 34 | 510 |
| 35 | 2,2-Bis[3-(p-aminophenylthioether)phenyl]propane | 0.75 | m-Cresol | 33 | 513 |
| 36 | 3,4'-Bis(p-aminophenoxy)diphenyl ether | 0.88 | m-Cresol | 31 | 519 |

EXAMPLE 37

Ten grams of the polyimide obtained in Example 1 and 0.5 g of γ-glycidoxypropyltrimethoxysilane were dissolved in 90 g of NMP, and the solution was casted onto a glass sheet while the roll coater was rotated at a rate of 150 rpm. The casting was heated under reduced pressure at 80° C. for 1 hour, then at 150° C. for 1 hour and finally at 200° C. for 1 hour, and the composite was submitted to adhesiveness testing. In the adhesivenss testing, the adhesiveness was evaluated by the cellophane adhesive tape peeling test. Thus, the coat film was provided with 100 meshes, each 1 mm square, by cutting in accordance with JIS D 0202, a cellophane adhesive tape piece was applied to the coat film and peeled off abruptly, and the meshes peeled off with the tape piece were counted.

The result of the cellophane adhesive tape peeling test (the number of meshes peeled off out of the 100 meshes) was 0 (zero). The thermal decomposition temperature was 558° C. In the absence of the silane coupling agent, the result of the cellophane adhesive tape peeling test was 60.

EXAMPLE 38

Ten grams of the polyimide obtained in Example 2 and 0.2 g of γ-(2-aminoethyl)aminopropyltrimethoxysilane were dissolved in 40 g of DMF to give a polyimide varnish. This was casted onto a glass sheet in the same manner as in Example 37. After heating, the composite was tested for adhesiveness and thermal decomposition temperature. The results obtained are shown in Table 4.

EXAMPLE 39

Five grams of the polyimide obtained in Example 3 and 0.4 g of γ-mercaptopropyltrimethoxysilane were dissolved in 50 g of NMP to give a polyimide varnish. The adhesiveness and thermal decomposition temperature were measured in the same manner as in Example 37. The results obtained are shown in Table 4.

EXAMPLE 40

Five grams of the polyimide obtained in Example 4 and 0.3 g of γ-chloropropyltrimethoxysilane were dissolved in 50 g of N,N-dimethylacetamide to give a polyimide varnish. The adhesiveness and thermal decomposition temperature were measured in the same manner as in Example 37. The results obtained are shown in Table 4.

EXAMPLES 41–43

Ten grams of the polyimide obtained in one of Examples 5–7 and 0.2 g of γ-aminopropyltriethoxysilane were dissolved in 40 g of NMP, and the adhesiveness and thermal decomposition temperature were measured in the same manner as in Example 37. The results obtained are shown in Table 4.

EXAMPLES 44–45

Five grams of the polyimide obtained in Example 8 or 9 and 0.3 g of γ-(2-aminoethyl)aminopropyltrimethoxysilane were dissolved in 95 g of DMF, and the adhesiveness and thermal decomposition temperature were measured in the same manner as in Example 37. The results obtained are shown in Table 4.

TABLE 4

| Example | 38 | 39 | 40 | 41 | 42 | 43 | 44 | 45 |
|---|---|---|---|---|---|---|---|---|
| Cellophane adhesive tape peel test* | 0 (72) | 0 (58) | 0 (83) | 0 (88) | 0 (89) | 0 (74) | 0 (92) | 0 (85) |
| Thermal decomposition (°C.) | 530 | 505 | 522 | 525 | 511 | 528 | 542 | 528 |

*Data obtained in the absence of any silane coupling agent are shown in the parentheses.

EXAMPLES 46–47

Five grams of the polyimide resin obtained in Example 10 or 11 and 0.4 g of γ-mercaptopropyltrimethoxysilane were dissolved in 100 g of NMP. For each polyimide resin varnish thus obtained, the adhesiveness and thermal decomposition temperature were measured. The results obtained are shown in Table 5.

TABLE 5

| Example | Cellophane adhesive tape peel test | Thermal decomposition temperature (°C.) |
|---|---|---|
| 46 | 0 | 518 |
| 47 | 0 | 512 |

EXAMPLES 48–65

Polyimide varnishes were prepared by dissolving, in various aprotic polar solvents, the polyimide obtained in each of Examples 12–25 and 32–35 together with 5% by weight, based on the polyimide, of γ-glycidoxypropyltrimethoxysilane. The solvents used, the polyimide concentrations, and the adhesiveness and thermal decomposition temperature data obtained in the same manner as in Example 37 are shown in Table 6.

TABLE 6

| Example | Solvent | Polyimide concentration (% by weight) | Cellophane adhesive tape peel test | Thermal decomposition temperature (°C.) |
|---|---|---|---|---|
| 48 | 1,3-Dimethyl-2-imidazolidione | 10 | 0 | 528 |
| 49 | 1,3-Dimethyl-2- | 10 | 0 | 519 |
| 50 | NMP | 20 | 0 | 603 |
| 51 | DMF | 10 | 0 | 593 |
| 52 | NMP | 20 | 0 | 513 |
| 53 | NMP | 20 | 0 | 508 |
| 54 | DMF | 10 | 0 | 512 |
| 55 | N,N-Diethylformamide | 10 | 0 | 521 |
| 56 | N,N-Diethylacetamide | 10 | 0 | 503 |
| 57 | Tetramethylurea | 10 | 0 | 518 |
| 58 | DMF | 10 | 0 | 522 |
| 59 | DMF | 10 | 0 | 528 |
| 60 | DMF | 10 | 0 | 583 |
| 61 | DMF | 10 | 0 | 579 |
| 62 | NMP | 20 | 0 | 528 |
| 63 | NMP | 10 | 0 | 512 |
| 64 | NMP | 10 | 0 | 509 |
| 65 | NMP | 10 | 0 | 513 |

EXAMPLES 66-67

Ten grams of the polyimide obtained in Example 1 or 2 and 0.2 g of γ-anilinopropyltrimethoxysilane were dissolved in 40 g of a phenolic solvent to give a polyimide varnish. The solvents used and the adhesiveness and thermal decomposition temperature data obtained in the same manner as in Example 37 are shown in Table 7.

TABLE 7

| Example | Phenolic solvent | Cellophane adhesive tape peel test* | Thermal decomposition temperature (°C.) |
|---|---|---|---|
| 66 | m-Cresol | 0 (52) | 548 |
| 67 | o-Chlorophenol | 0 (69) | 524 |

*Data obtained in the absence of any silane coupling agent are shown in the parentheses.

COMPARATIVE EXAMPLE 1

In 300 g of NMP was dissolved 43.2 g (0.1 mole) of 4,4'-bis(p-aminophenoxy)diphenyl sulfone. To the solution was added gradually 32.2 g (0.1 mole) of benzophenone-3,3',4,4'-tetracarboxylic dianhydride (hereinafter abbreviated as "BPTA"), and the reaction was carried out in the same manner as in Example 1 to give a polyamic acid solution. Then, the reaction was conducted at 150° C. for 5 hours, whereupon the solution became an unhomogeneous gel-like matter. Further addition of 300 g of NMP and the subsequent heating with stirring failed to give a homogeneous solution.

COMPARATIVE EXAMPLE 2

In 300 g of DMF was dissolved 41.0 g (0.1 mole) of 2,2-bis[4-(p-aminophenoxy)phenyl]propane. Then, 32.2 g (0.1 mole) of BPTA was added gradually, and the reaction was conducted in the same manner as in Example 2 to give a polyamic acid. Further heating at 170° C. for 3 hours gave an ununiform gel-like matter. Further addition of 300 g of DMF and the subsequent stirring with heating failed to give a homogeneous solution.

COMPARATIVE EXAMPLE 3

The procedure of Example 1 was followed in the same manner except that 42.4 g (0.1 mole) of 3,3',4,4'-diphenyl sulfonetetracarboxylic acid dimethyl ester was used in lieu of 35.8 g (0.1 mole) of DSTA.

The polyimide obtained had an inherent viscosity of 0.15 dl/g, a thermal decomposition temperature of 420° C., and a tensile strength of 3.2 kg/mm$^2$; its inherent viscosity was low (its molecular weight was low) and its heat resistance and mechanical characteristics were inferior.

COMPARATIVE EXAMPLE 4

In 400 g of NMP was dissolved 41 g (0.1 mole) of 2,2-bis[4-(4-aminophenoxy)phenyl]propane, followed by gradual addition of 32.2 g (0.1 mole) of 3,3',4,4'-benzophenonetetracarboxylic anhydride. The reaction was carried out at 25°-30° C. for 2 hours to give a polyamic acid. This polyamic acid had an inherent viscosity of 1.2 dl/g.

A varnish was prepared by adding to 100 g of this polyamic acid solution 1.1 g of γ-glycidoxypropyltrimethoxysilane and tested for adhesiveness and thermal decomposition temperature in the same manner as in Example 37. The film strength was extremely low and the film was ununiform, so that the film dropped off on the occasion of cutting it for mesh formation. The thermal decomposition temperature was also as low as 483° C.

Figure 1:
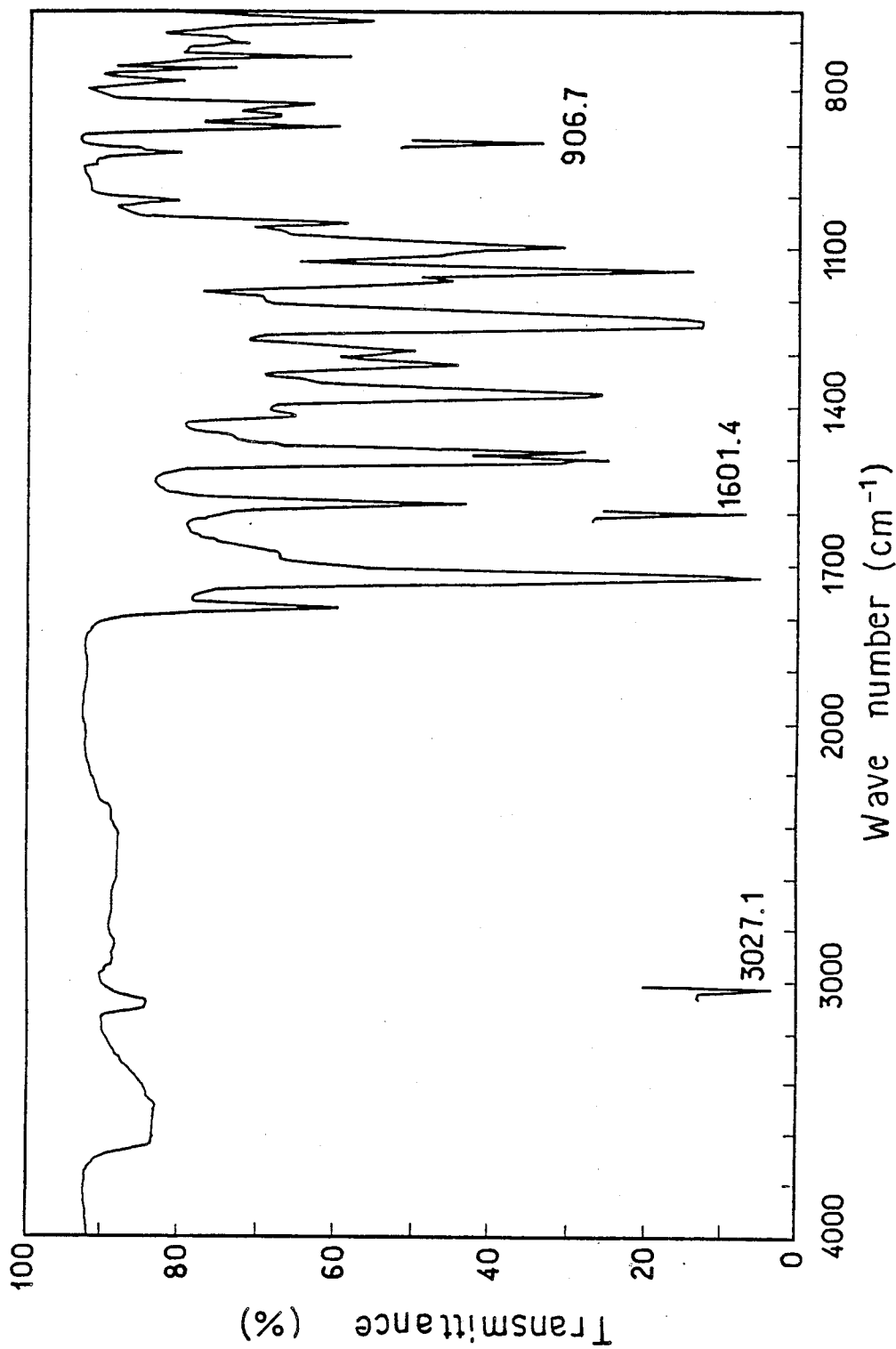
FIG. 1 shows the infrared absorption spectrum of the polyimide obtained in Example 1.

What is claimed is:

1. A polyimide resin composition which comprises at least one polyimide having a repeating unit of the general formula

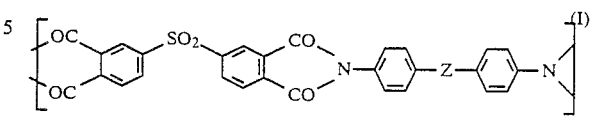

wherein Z is —S—,

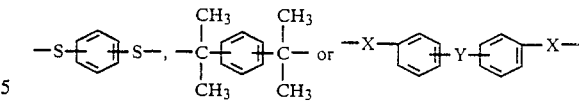

in which X is —O—, —S—, or

Y is a single chemical bond or Y represents a bivalent group selected from the group consisting of —O—, —S—, —SO$_2$—,

and —CO—, and R$^1$ and R$^2$ are the same or different and each independently is a hydrogen atom, a halogen atom or a lower alkyl group optionally substituted by a halogen atom or atoms, and having an inherent viscosity ($\eta_{inh}$) measured in an N-methyl-2-pyrrolidone solvent at a concentration of 0.5 g/100 ml and at a temperature of 30±1° C. of about 0.3— about 5.0 dl/g, said polyimide being dissolved in an organic solvent.

2. A composition as claimed in claim 1, wherein the organic solvent is at least one member selected from among aprotic polar organic solvents and phenolic organic solvents.

3. A composition as claimed in claim 1, wherein the polyimide concentration is about 1— about 50% by weight.

4. A polyimide resin composition which comprises a composition as claimed in claim 1 and a silane coupling agent added thereto.

5. A composition as claimed in claim 4, wherein the organic solvent is at least one member selected from among aprotic polar organic solvents and phenolic organic solvents.

6. A composition as claimed in claim 4, wherein the polyimide concentration is about 1— about 50% by weight.

7. A composition as claimed in claim 4, wherein the silane coupling agent is added in an amount of about 0.1— about 20% by weight based on the polyimide.

8. A method of producing a polyimide resin composition which comprises reacting diphenyl sulfone-3,3',4,4'-tetracarboxylic dianhydride with an aromatic diamine of the general formula

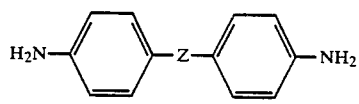
(II)

wherein Z is —S—,

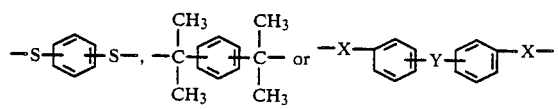

in which X is —O—, —S—, or

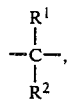

Y is a single chemical bond or Y represents a bivalent group selected from the group consisting of —O—, —S—, —SO$^2$—,

and —CO—, and $R^1$ and $R^2$ are the same or different and each independently is a hydrogen atom, a halogen atom or a lower alkyl group substituted by a halogen atom or atoms, in the presence of an organic solvent, under conditions sufficient to convert such to of a polyimide.

9. A method of production as claimed in claim 8, wherein the organic solvent is at least one member selected from the group consisting of aprotic polar organic solvents and phenolic organic solvents.

10. A method of production as claimed in claim 8, wherein the mole ratio between diphenyl sulfone-3,3',4,4'-tetracarboxylic dianhydride and the aromatic diamine of the general formula (II) is about 0.7— about 1.3.

11. A method of producing a polyimide resin composition as claimed in claim 8 which further comprises, adding a silane coupling agent after completion of the polyimide formation reaction.

12. A method of production as claimed in claim 11, wherein the organic solvent is at least one member selected from the group consisting of aprotic polar organic solvents and phenolic organic solvents.

13. A method of production as claimed in claim 11, wherein the mole ratio between diphenyl sulfone-3,3',4,4'-tetracarboxylic dianhydride and the aromatic diamine of general formula (II) is about 0.7— about 1.3.

14. A method of production as claimed in claim 11, wherein the silane coupling agent is added in an amount of about 0.1— about 20% by weight based on the polyimide.

15. The method as claimed in claim 8 including separating said produced polyimide from said reaction solvent, and dissolving such polyimide in an organic solvent.

* * * * *

UNITED STATES PATENT AND TRADEMARK OFFICE
CERTIFICATE OF CORRECTION

PATENT NO. : 4,996,293

DATED : February 26, 1991

INVENTOR(S) : Tsutoshi IKEDA, et al

It is certified that error appears in the above-identified patent and that said Letters Patent is hereby corrected as shown below:

On the title page, Item [19] should read --Ikeda, et al--.

Item [75] --Mikio Nakazawa, Uji-shi, Japan,

Hiroshi Manami; Joyo-shi, Japan, Yuji Kawashima,

Otsu-shi, Japan--should be added.

Signed and Sealed this

Thirteenth Day of October, 1992

Attest:

DOUGLAS B. COMER

*Attesting Officer*  *Acting Commissioner of Patents and Trademarks*